(12) United States Patent
Jung et al.

(10) Patent No.: US 9,659,681 B2
(45) Date of Patent: May 23, 2017

(54) TRANSPARENT CONDUCTIVE THIN FILM

(71) Applicant: Samsung Electronics Co., Ltd., Suwon-si, Gyeonggi-Do (KR)

(72) Inventors: Doh Won Jung, Seoul (KR); Hee Jung Park, Suwon-si (KR); Chan Kwak, Suji-gu (KR); Byungki Ryu, Hwaseong-si (KR); Kyu Hyoung Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

(21) Appl. No.: 14/528,390

(22) Filed: Oct. 30, 2014

(65) Prior Publication Data
US 2015/0123046 A1     May 7, 2015

(30) Foreign Application Priority Data

Nov. 1, 2013    (KR) ........................ 10-2013-0132502

(51) Int. Cl.
*H01B 1/08*     (2006.01)
*H01B 1/02*     (2006.01)
*C01G 31/02*     (2006.01)

(52) U.S. Cl.
CPC ............... *H01B 1/08* (2013.01); *C01G 31/02* (2013.01); *H01B 1/02* (2013.01)

(58) Field of Classification Search
None
See application file for complete search history.

(56) References Cited

U.S. PATENT DOCUMENTS

| | | | |
|---|---|---|---|
| 5,470,618 A | 11/1995 | Ohara et al. | |
| 5,667,853 A | 9/1997 | Fukuyoshi et al. | |
| 5,824,278 A * | 10/1998 | Yao | C01B 13/363 423/263 |
| 5,995,359 A | 11/1999 | Klee et al. | |
| 5,995,369 A | 11/1999 | Kiermeier et al. | |
| 6,679,996 B1 * | 1/2004 | Yao | C23C 18/06 216/100 |
| 9,019,502 B1 * | 4/2015 | Ohodnicki, Jr. | G01N 21/783 356/437 |
| 2003/0056819 A1 * | 3/2003 | Imai | C01B 17/20 136/239 |
| 2004/0089540 A1 | 5/2004 | Van Heuveln et al. | |
| 2005/0081906 A1 * | 4/2005 | Adachi | C01G 31/00 136/238 |
| 2005/0146249 A1 * | 7/2005 | Miyazawa | B41J 2/14233 310/358 |
| 2011/0240338 A1 * | 10/2011 | Gruner | B82Y 15/00 174/126.1 |
| 2012/0107603 A1 | 5/2012 | DiDomizio et al. | |
| 2012/0300168 A1 | 11/2012 | Hoke | |

FOREIGN PATENT DOCUMENTS

| | | |
|---|---|---|
| JP | 02181304 A | 7/1990 |
| JP | 3079262 B2 | 8/2000 |
| JP | 3194012 B2 | 7/2001 |
| JP | 2007031178 A | 2/2007 |
| JP | 04187758 B2 | 11/2008 |
| KR | 100438330 B1 | 7/2004 |
| KR | 20120060602 A | 6/2012 |
| WO | WO-2010119687 A1 | 10/2010 |

OTHER PUBLICATIONS

English text machine translation of Cho (KR-100438330-B1), powered by EPO and Google, accessed from the Espacenet website on May 16, 2016, a copy of which is attached as a PDF, pp. 1-3.*
Liberati, Marco, et al. ["Epitaxial growth and characterization of CaVO3 thin films", published on Aug. 21, 2009, permalink is http://escholarship.org/uc/item/1kw3s27v ; accessed online from Lawrence Berkeley National Laboratory; a copy is attached to the case file as a PDF].*
Minami, Tadatsugu. "Transparent Conducting Oxide Semiconductors for Transparent Electrodes." *Semicoductor Science and Technology* 20 (2005): 35-44.
Inoue, Isao H. "Anamalous Electronic Properties of CaVO3 Due to Oxygen Off-stoichimetry." *Electronic States of Correlated Transition Metal Oxides*. U of Tokyo, 1998.
Hui, Shiqiang et al. "Conductivity and Stability of SrVO3 and Mixed PerovSkites at Low Oxygen Partial Pressures." *Solid State Ionics* 143.201 (2001): 275-83.
"Density Functional Perturbation Theory." Wikipedia. Web. <http://en.wikipedia.org/wiki/Density_functional_theory>, (Oct. 28, 2014).
Minami, Tadatsugu. "New N-Type Transparent Conducting Oxides." *MRS BULLETIN* Aug. 2000: 38-44.

* cited by examiner

*Primary Examiner* — Mark Kopec
*Assistant Examiner* — Katie L Hammer
(74) *Attorney, Agent, or Firm* — Harness, Dickey & Pierce, P.L.C.

(57) ABSTRACT

Disclosed is a transparent conductive thin film and an electronic device including the same. The transparent conductive thin film may include a perovskite vanadium oxide represented by Chemical Formula 1, $A_{1-x}VO_{3\pm\delta}$            [Chemical Formula 1]

wherein A is a Group II element, $0 \leq x < 1$, and $\delta$ is a number necessary for charge balance in the oxide.

13 Claims, 9 Drawing Sheets

TRANSPARENT CONDUCTIVE THIN FILM

CROSS-REFERENCE TO RELATED APPLICATION

This application claims priority under 35 U.S.C. §119 to Korean Patent Application No. 10-2013-0132502 filed in the Korean Intellectual Property Office on Nov. 1, 2013, the entire contents of which are incorporated herein by reference.

BACKGROUND

1. Field

The present disclosure relates to transparent conductive thin films and electronic devices including the same.

2. Description of Related Art

Electronic devices such as flat panel displays (e.g., a liquid crystal display and a light emitting diode display), touch panel screens, photovoltaic cells, and transparent transistors include transparent electrodes. It is desirable for materials of the transparent electrode to have high transmittance (e.g., at least 80%) and low specific resistivity of $1 \times 10^{-3}$ or lower. The currently available materials for the transparent electrode include indium tin oxide (ITO), tin oxide ($SnO_2$), zinc oxide (ZnO), and the like. The ITO is an n-type semiconductor having electrons and oxygen vacancies generated by $SnO_2$. Electrical and optical characteristics of the ITO may depend on the defects in the crystalline $In_2O_3$ structure. The ITO may include a solid solution compound being composed of $In_2O_3$ at 90 wt % and $SnO_2$ at 10 wt %, and may exhibit a high level of carrier concentration. However, ITO tends to have poor flexibility. Also, limited reserves of indium may lead to an increasing cost thereof so that it is desirable to develop a material that may substitute for the ITO. Tin oxides (e.g., $SnO_2$) are less expensive and chemically stable but may not be etched easily. Also, the resistivity of tin oxides may be higher than that of indium oxide and zinc oxide, and a high process temperature may be used with tin oxides. Zinc oxide is reported to have transmittance and electrical conductivity that are comparable to those of ITO, but zinc oxide may be chemically unstable and may not provide a high etching ratio and a well defined pattern when it is subjected to a wet etching process. The above-discussed transparent electrode materials have specific resistivity of about $1 \times 10^{-4}$ to $4 \times 10^{-4}$ $\Omega$cm.

Recently, there has been a growing demand for flexible displays or ultra high definition (UHD) displays so that it is desirable to develop novel materials for transparent electrodes, enabling the realization of a lower level of specific resistivity together with high transmittance.

SUMMARY

Example embodiments relate to a transparent electrode material having high conductivity and/or excellent light transmittance.

Example embodiments also relate to an electronic device including the transparent electrode material.

According to example embodiments, a transparent conductive thin film includes a perovskite vanadium oxide represented by Chemical Formula 1, $$A_{1-x}VO_{3\pm\delta} \quad \text{[Chemical Formula 1]}$$

wherein A is a Group II element, 0≤x<1, and δ is a number necessary for charge balance in the oxide.

In example embodiments, the Group II element may include one of calcium (Ca), strontium (Sr), barium (Ba), and a combination thereof.

In example embodiments, in Chemical Formula 1, x may be equal to or larger than zero and less than 0.5.

In example embodiments, a conductivity of the transparent conductive thin film may be greater than or equal to about 5000 S/cm.

In example embodiments, a transmittance of the transparent conductive thin film may be greater than or equal to about 60% with respect to light of a wavelength of about 550 nm.

In example embodiments, a relative density of the transparent conductive thin film may be greater than or equal to about 70% with respect to an ideal density, as measured according to ASTM C373.

According to example embodiments, an electronic device includes a transparent conductive thin film. The transparent conductive film includes a perovskite vanadium oxide represented by Chemical Formula 1, $$A_{1-x}VO_{3\pm\delta} \quad \text{[Chemical Formula 1]}$$

wherein A is a Group II element, 0≤x<1, and δ is a number necessary for charge balance in the oxide.

In example embodiments, the electronic device may be one of a flat panel display, a touch panel screen, a photovoltaic cell, an e-window, a heat mirror, and a transparent transistor.

DETAILED DESCRIPTION

Figure 1:
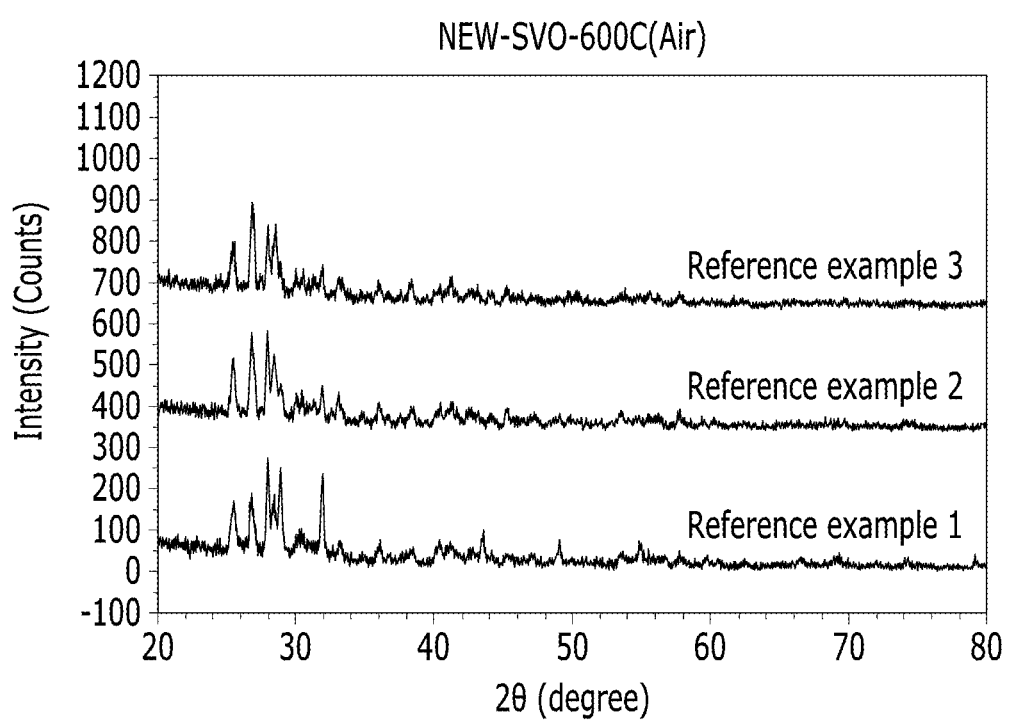
FIG. 1 includes XRD spectrums of an oxide obtained by first calcination in Reference Examples 1 to 3.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and regions are exaggerated for clarity. Like reference numerals in the drawings denote like elements, and thus their description may be omitted. Well-known process technologies may not explained in detail in order to avoid vague interpretations of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

According to example embodiments, a transparent conductive thin film may include a perovskite vanadium oxide represented by Chemical Formula 1:

$A_{1-x}VO_{3\pm\delta}$  [Chemical Formula 1]

wherein A is a Group II element, $0 \leq x < 1$, and $\delta$ is a number necessary for charge balance in the oxide. For example, $\delta$ may be a number in a range of −0.5 to 0.5.

As used herein, the term "perovskite vanadium oxide" refers to a vanadium oxide having a perovskite structure. As used herein, the term "perovskite structure" refers to a crystalline structure of a cubic system, a tetragonal system, an orthorhombic system, a monoclinic system, or a hexagonal system that may be found in a compound having a formula of $ABO_3$ such as $CaTiO_3$.

The Group II element included in the A site may be calcium (Ca), strontium (Sr), barium, or a combination thereof.

The perovskite vanadium oxide may be an A-site-deficient oxide. In other words, the perovskite vanadium oxide may be represented by Chemical Formula 1, wherein x is greater than 0. In Chemical Formula 1, x may be greater than or equal to zero, for example, at least about 0.01, at least about 0.05, at least about 0.06, at least about 0.07, at least about 0.08, at least about 0.09, or at least about 0.1. When the element of the A site is deficient in the vanadium oxide (e.g., in case of the A-site-deficient perovskite vanadium oxide), a thin film including the same may have high transparency and greatly enhanced conductivity. In Chemical Formula 1, x is less than one, for example, less than or equal to about 0.7, less than or equal to about 0.5, less than or equal to about 0.4, or less than or equal to about 0.3.

The transparent conductive thin film may have an electrical conductivity of greater than or equal to about 5000 S/cm, for example, greater than or equal to about 6000 S/cm, greater than or equal to about 6500 S/cm, greater than or equal to about 7000 S/cm, greater than or equal to about 7500 S/cm, greater than or equal to about 8000 S/cm, or greater than or equal to about 9000 S/cm. When the element of the A site is deficient in the perovskite vanadium oxide, the transparent conductive thin film including the same may show significantly improved conductivity. For example, the thin film may have electrical conductivity about two or three times higher than that of an ITO electrode or a non-deficient perovskite vanadium oxide. In non-limiting examples, the transparent conductive thin film may have electrical conductivity of at least about 10,000 S/cm, for example, at least about 12,000 S/cm.

The transparent conductive thin film may exhibit a metallic behavior wherein the conductivity decreases with a temperature increase. The electrical conductivity of the transparent conductive thin film may increase as a density thereof decreases. When the transparent conductive thin film includes an A-site-deficient perovskite vanadium oxide, it may show electrical conductivity of higher than that of a thin film including $AVO_3$ and having the same density. In non-limiting examples, the transparent conductive thin film may have a relative density of greater than or equal to about 70%, for example, greater than or equal to about 72%, greater than or equal to about 74%, or greater than or equal to about 80%. In order to obtain a thin film having a higher density, it is possible to adjust deposition conditions (e.g., a power, a holding time, and the like) and/or to conduct post-annealing. In thermal evaporation, using a fine particle obtained by a milling process may be advantageous for increasing the density.

The transparent conductive thin film may have transmittance of greater than or equal to about 60%, for example, greater than or equal to about 70%, or greater than or equal to about 80% with respect to light having a wavelength of about 550 nm. The transparent conductive thin film may have a thickness of less than or equal to about 100 nm, for example, less than or equal to about 40 nm. As such, the transparent conductive thin film including the aforementioned perovskite vanadium oxide may have significantly increased conductivity together with high transmittance, and thus it may find great utility in transparent electrode materials. For example, it may provide a transparent electrode material having conductivity over a limit of conventional transparent electrode materials.

The transparent conductive thin film including the aforementioned perovskite vanadium oxide may be prepared by physical vapor deposition (PVD) such as thermal evaporation and a sputtering method, chemical vapor deposition such as MOCVD, a solution-based synthesis method such as a sol-gel method, a chemical solution method, and the like. The solution based synthesis method including the sol-gel method may provide a patterned thin film using inkjet printing.

In non-limiting examples, the transparent conductive thin film including the perovskite vanadium oxide may be prepared by conducting a sputtering process using a sintered target of a desired composition and a sputtering gas including an inert gas. The sintered target will be explained in more detail below. The sputtering may be conducted using any known or commercially available apparatus. The conditions for the sputtering may be selected appropriately. In non-limiting examples, the sputtering may be conducted by using a magnetron sputtering apparatus including a DC power supply, an RF power supply, or a combination thereof. The inert gas may be nitrogen ($N_2$), argon (Ar), helium (He), neon (Ne), krypton (Kr), or a combination thereof. For example, it may be argon. The sputtering gas may further include oxygen or hydrogen, if desired. The sputtering temperature is not particularly limited and may be in a range from about 10° C. to about 400° C. The distance between the target and a substrate is not particularly limited, and may be greater than or equal to about 5 cm, for example, may range from 10 cm to 30 cm. The sputtering time may be five minutes or longer, but it is not limited thereto. The thickness of the thin film may be controlled by adjusting the sputtering time. On sputtering, the vacuum degree may be appropriately selected. For example, the vacuum degree may be less than or equal to about 0.1 torr, for example, less than or equal to about 0.01 torr, less than or equal to about $9 \times 10^{-3}$ torr, less than or equal to about $8 \times 10^{-3}$ torr, or less than or equal to about $7 \times 10^{-3}$ torr, but it is not limited thereto. Materials and shapes of the substrate are not particularly limited but may be selected appropriately. For example, the substrate may be an inorganic oxide such as glass; quartz; resins such as polystyrene, polycarbonate, polyolefin, polyethylene terephthalate, polyimide, and the like; a semiconductor material including Si, Ga, or the like; a crystalline material such as a mono-crystalline or polycrystalline one, but it is not limited thereto. The substrate may have any shape.

In non-limiting examples, the thin film may be prepared via thermal evaporation from a sintered body of a precursor mixture having a desired composition. Examples of the precursor will be described below in relation to the production of the sintered body. By way of non-limiting examples, the thermal evaporation may be carried out under vacuum. The temperature of the thermal evaporation may be greater than or equal to about 400° C., for example in a range from about 500° C. to about 600° C., but it is not limited thereto. Details of the substrate available for the thermal evaporation are the same as set forth above.

In non-limiting examples, the sintered target may be prepared by a method including mixing precursor powders in a desired ratio and drying a resulting mixture; calcining the dried powder mixture in an air atmosphere; re-calcining the calcined product in a reducing atmosphere; and sintering the re-calcined product in a reducing atmosphere.

Types of the precursor are not particularly limited and may be appropriately selected. For example, available precursor powders may include a carbonate and/or an oxide powder such as $CaCO_3$, $SrCO_3$, $BaCO_3$, SrO, CaO, BaO, and the like; and $V_2O_5$ powders. The precursor powders are mixed to obtain a mixture having a desired composition corresponding to the sintered target. Conditions for the calcination under the air atmosphere are not particularly limited and may be selected appropriately. For example, the calcination under the air atmosphere may be carried out at a temperature of greater than or equal to about 400° C., for example in a range from about 600° C. to about 700° C. for at least about one hour, for example, for about 12 hours to about 24 hours. Conditions for the calcination under the reducing atmosphere are not particularly limited and may be selected appropriately. For example, the calcination under the reducing atmosphere may be carried out at a temperature of greater than or equal to about 800° C., for example in a range from about 1000° C. to about 1100° C. for at least about one hour, for example, at least about five hours, at least about six hours, or for about 8 hours to about 16 hours. The reducing atmosphere may include a gas mixture of hydrogen and an inert gas such as nitrogen, argon, or the like. The sintering may be carried out at a temperature of greater than or equal to about 1300° C., for example in a range from about 1400° C. to about 1600° C. for at least about one hour, for example, at least about five hours, at least about six hours, or for about 8 hours to about 16 hours, but it is not limited thereto. Such sintering may produce a sintered target of a single phased, perovskite vanadium oxide.

The sintered body target may be used in thin film preparation by a sputtering method such as DC or RF magnetron sputtering. In addition, the calcined product under the air atmosphere, the re-calcined product under the reducing atmosphere, or the sintered target may be used as a raw material in a thin film preparation by thermal evaporation.

In example embodiments, an electronic device including a transparent conductive thin film is provided, which includes:

a perovskite vanadium oxide represented by Chemical Formula 1, $A_{1-x}VO_{3\pm\delta}$      [Chemical Formula 1]

wherein A is a Group II element, $0 \le x < 1$, and $\delta$ is a number necessary for charge balance in the oxide.

Details for the perovskite vanadium oxide and the thin film including the same have already been explained above. The electronic device may be a flat panel display, a touch panel screen, a photovoltaic cell, an e-window, a heat mirror, or a transparent transistor.

According to example embodiments, a perovskite vanadium oxide may be provided as a transparent and electrically conductive material having a high level of conductivity compared to ITO.

The following examples illustrate non-limiting examples of example embodiments. However, example embodiments are not limited to these examples.

EXAMPLES

Reference Example 1

Preparation of $SrVO_3$ Sintered Body Target 14.763 g of a $SrCO_3$ powder and 9.094 g of a $V_2O_5$ powder are mixed using a planetary ball mill for one hour. The resulting mixture is put into a container and dried in a vacuum oven for one hour. The dried mixture is subjected to a first calcination in air at a temperature of 600° C. for 24 hours. The calcined product is re-calcined under a reducing atmosphere (5% $H_2$ and 95% $N_2$) at a temperature of 1100° C. for 8 hours (a second calcination). If desired, the re-calcination under the reducing atmosphere may be repeated for two or three times to obtain a product having a single phase. The resulting re-calcined product is pressed under a pressure of 50 MPa with a uniaxial press to prepare a pellet. The pellet thus obtained is heat-treated under a reducing atmosphere (5% $H_2$ and 95% $N_2$) at a temperature of 1400° C. (or 1500° C.) for 8 hours to prepare a sintered body.

Figure 2:
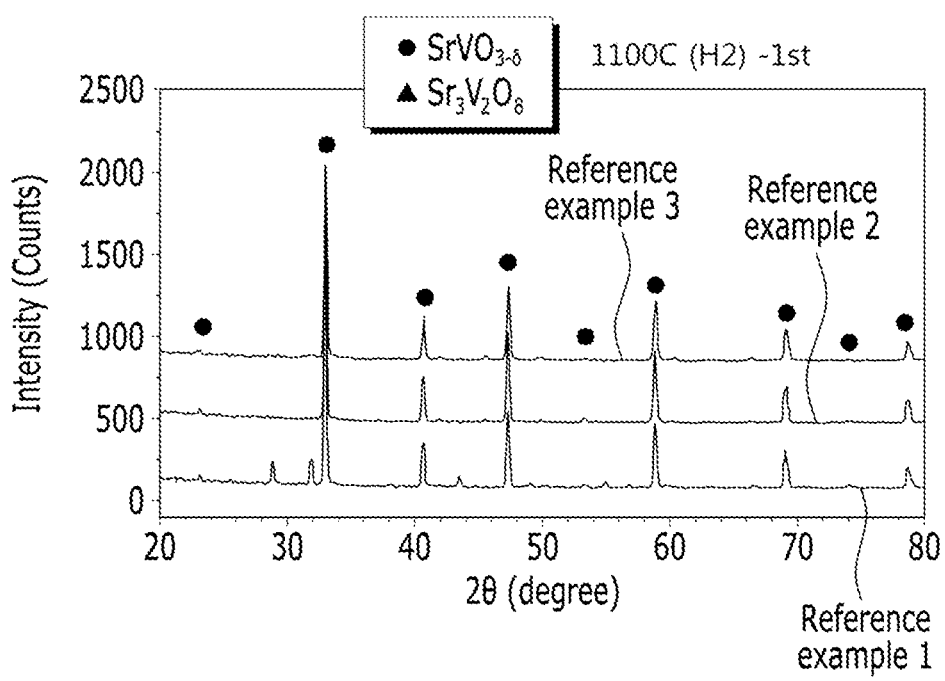
FIG. 2 includes XRD spectrums of an oxide obtained by second calcination in Reference Examples 1 to 3.
Figure 3:
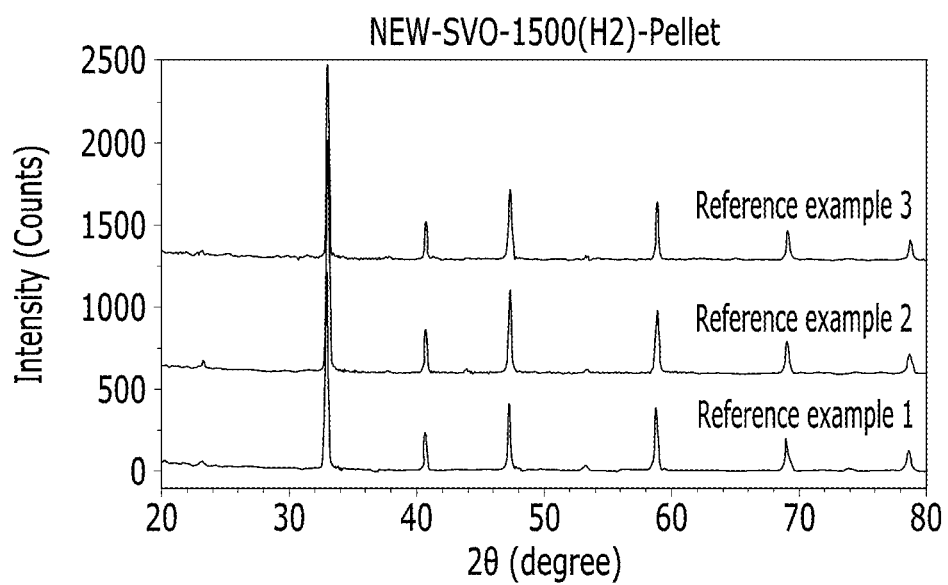
FIG. 3 includes XRD spectrums of sintered bodies obtained by heat-treatment in Reference Examples 1 to 3.

An X-ray diffraction analysis is made for each of the products obtained from the first calcination, the re-calcination, and the heat-treatment for sintering, and the results are shown in FIG. 1 (for the product of the first calcination), FIG. 2 (for the product of the re-calcination), and FIG. 3 (for the product of the heat-treatment for sintering), respectively.

FIG. 1, FIG. 2, and FIG. 3 confirm that the product obtained from the first calcination includes a mixture of $Sr_3V_2O_5$ and $Sr_2V_2O_7$, the product obtained from the re-calcination includes $SrVO_3$ and a trace amount of $Sr_3V_2O_5$, and the sintered pellet obtained from the heat treatment consists of a single phase of $SrVO_3$.

Reference Example 2

Preparation of $Sr_{0.9}VO_3$ Sintered Body Target

A perovskite vanadium oxide of $Sr_{0.9}VO_3$ is prepared in the same manner set forth in Reference Example 1, except that 13.287 g of a $SrCO_3$ powder and 9.094 g of a $V_2O_5$ powder are mixed and the pellet thus obtained is heat-treated under a reducing atmosphere (5% $H_2$ and 95% $N_2$) at a temperature of 1400° C., 1500° C., or 1600° C. to prepare a sintered body.

An X-ray diffraction analysis is made for each of the products obtained from the first calcination, the recalcination, and the heat-treatment for sintering, and the results are shown in FIG. 1 (for the product of the first calcination), FIG. 2 (for the product of the re-calcination), and FIG. 3 (for the product of the heat-treatment for sintering at 1500° C.), respectively.

FIG. 1, FIG. 2, and FIG. 3 confirm that the product obtained from the first calcination includes a mixture of $Sr_3V_2O_8$ and $Sr_2V_2O_7$, the product obtained from the re-calcination consists of a perovskite single phase of $Sr_{0.9}VO_3$, and the sintered pellet obtained from the heat treatment consists of a perovskite single phase of $Sr_{0.9}VO_3$, as well.

For each of the sintered bodies, density is measured in accordance with ASTM C373, grain size is measured from a SEM image, and conductivity is measured in accordance with the 4 probe DC method using a multimeter (Keithley 2420 source meter) at room temperature. Results are compiled in Table 1.

TABLE 1

| composition | Density (%) | Grain size (μm) | Conductivity (S/cm) |
| --- | --- | --- | --- |
| $Sr_{0.9}VO_3$ | 70.0 | ~2 | 3693 |
|  | 74.7 | 3~4 | 7474 |
|  | 83.2 | 5~6 | 16,250 |

The results of Table 1 confirm that the sintered body of $Sr_{0.9}VO_3$ may have a very high level of conductivity.

Reference Example 3

Preparation of $Sr_{0.8}VO_3$ Sintered Body Target

A perovskite vanadium oxide of $Sr_{0.8}VO_3$ is prepared in the same manner set forth in Reference Example 1, except that 11.810 g of a $SrCO_3$ powder and 9.094 g of a $V_2O_5$ powder are mixed.

An X-ray diffraction analysis is made for each of the products obtained from the first calcination, the recalcination, and the heat-treatment for sintering, and the results are shown in FIG. 1 (for the product of the first calcination), FIG. 2 (for the product of the re-calcination), and FIG. 3 (for the product of the heat-treatment for sintering), respectively.

FIG. 1, FIG. 2, and FIG. 3 confirm that the product obtained from the first calcination includes $Sr_3V_2O_8$ and $Sr_2V_2O_7$, the product obtained from the re-calcination consists of a perovskite single phase of $Sr_{0.8}VO_3$, and the sintered pellet obtained from the heat treatment consists of a perovskite single phase of $Sr_{0.8}VO_3$, as well.

Reference Example 4

Preparation of $CaVO_3$ Sintered Body Target

A perovskite vanadium oxide of $CaVO_3$ is prepared in the same manner set forth in Reference Example 1, except that 10.009 g of a $CaCO_3$ powder and 9.094 g of a $V_2O_5$ powder are used.

Reference Example 5

Preparation of $Ca_{0.9}VO_3$ Sintered Body Target

Figure 4:
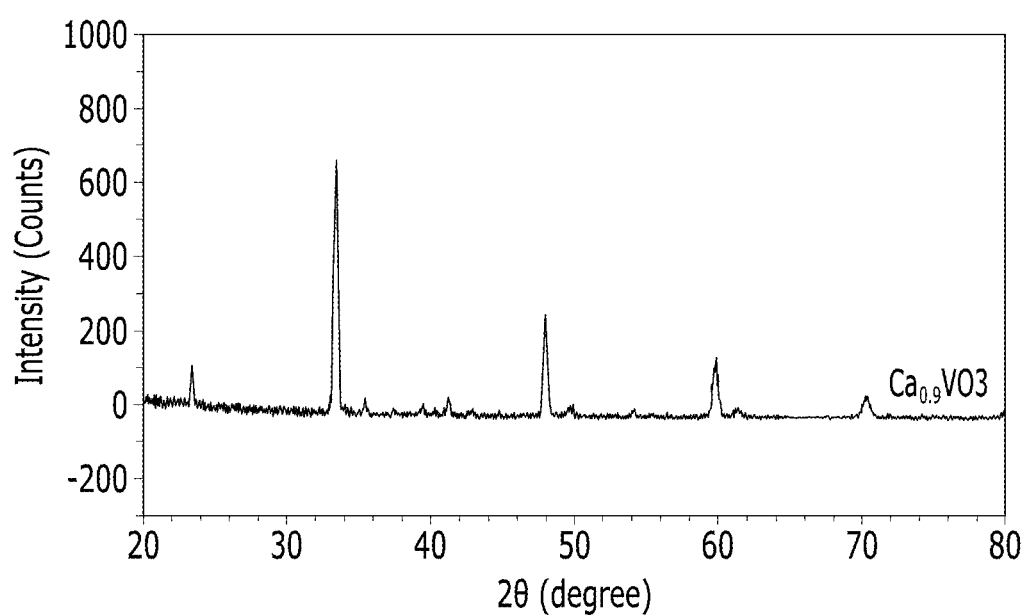
FIG. 4 is an XRD spectrum of sintered bodies obtained by the heat-treatment in Reference Examples 1 to 3.

A perovskite vanadium oxide of $Ca_{0.9}VO_3$ is prepared in the same manner set forth in Reference Example 1, except that 9.008 g of a $CaCO_3$ powder and 9.094 g of a $V_2O_5$ powder are used. The XRD pattern for the product thus obtained is shown in FIG. 4, which confirms that $Ca_{0.9}VO_3$ perovskite vanadium oxide has a single phase of an orthorhombic crystalline structure.

Composition Analysis of the Sintered Body Thus Obtained

Analysis of inductively coupled plasma atomic emission spectroscopy is made for each sample of $SrVO_3$, $Sr_{0.9}VO_3$, and $Sr_{0.8}VO_3$ prepared from Reference Examples 1 to 3 using ICPS-8100 manufactured by Shimadzu Co., Ltd. Results are compiled in Table 2.

TABLE 2

|  | Mole ratio (%) | | Composition ratio |
| --- | --- | --- | --- |
| composition | Sr | V | (Sr:V) |
| Reference Example 1 ($SrVO_3$) | 0.495 | 0.505 | Sr:V = 0.99:1.01 |
| Reference Example 2 ($Sr_{0.9}VO_3$) | 0.467 | 0.533 | Sr:V = 0.89:1.01 |
| Reference Example 3 ($Sr_{0.8}VO_3$) | 0.439 | 0.561 | Sr:V = 0.79:1.01 |

The results of Table 2 confirm that the sintered body thus prepared has a desired composition.

Experimental Example 1

Measurement of Conductivity

For each of the perovskite vanadium oxides prepared from Reference Examples 1 to 5, conductivity is measured in the following manner and the results are compiled in Table 3.

For each of the sintered body pellets, a conductivity is measured using a multimeter (Keithley 2420 source meter) at room temperature in accordance with the 4-probe method. An electrical current is applied to a sample and a voltage drop is measured to calculate the resistivity from the IV graph. Then, the specific resistivity and conductivity are calculated considering the sample size.

TABLE 3

| Sample | composition | conductivity (S/cm) |
| --- | --- | --- |
| Reference Example 1 | $SrVO_3$ | 3200 |
| Reference Example 2 | $Sr_{0.9}VO_3$ | 16250 |
| Reference Example 3 | $Sr_{0.8}VO_3$ | 8110 |
| Reference Example 4 | $CaVO_3$ | 5555 |
| Reference Example 5 | $Ca_{0.9}VO_3$ | 13,450 |
| Comparative Example 1 | ITO | about 5000 |
| Comparative Example 2 | $La_{0.9}VO_3$ | 3.3 (as known in the art) |
| Comparative Example 3 | $La_{0.8}Sr_{0.2}VO_3$ | 120 (as known in the art) |
| Comparative Example 4 | $La_{0.7}Sr_{0.3}VO_3$ | 300 (as known in the art) |

The results of Table 3 confirm the following. The perovskite vanadium oxide as prepared may show conductivity that is at least three times higher than that of the ITO electrode material as commonly used in the art. In addition, the A site (e.g., Ca or Sr) deficient vanadium oxide obtained from Reference Examples 2, 3, and 5 may have conductivity that is at least three times higher than that of the vanadium oxide obtained from Reference Examples 1 and 2. Moreover, the perovskite vanadium oxide of Reference Examples 1 to 5 may have conductivity that is far higher than that of other perovskite vanadium oxides of Comparative Examples 2 to 4.

Experimental Example 2

Changes in Conductivity Depending on Density

Figure 5:
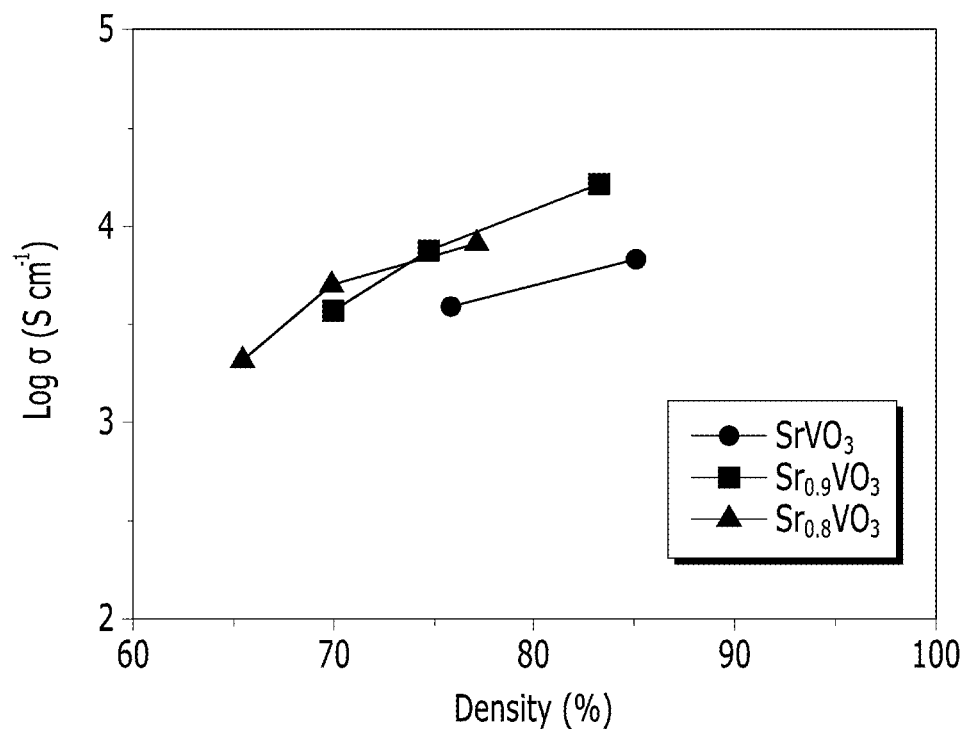
FIG. 5 shows a graph illustrating changes in conductivity versus density of the thin film of the perovskite oxides prepared by Reference Examples 1 to 3.

Similar methods to those of Reference Examples 1 to 3 except using different sintering temperatures are used to prepare a perovskite vanadium oxide of $SrVO_3$ having a density of 75.8% at a sintering temperature of 1400° C. and 85% at 1500° C.; a perovskite vanadium oxide having a density of 70.0% at a sintering temperature of 1400 and a density of 74.7% at a sintering temperature of 1500° C.; and a perovskite vanadium oxide of $Sr_{0.9}VO_3$ having a density of 83.2% at a sintering temperature of 1600° C., a perovskite vanadium oxide of $Sr_{0.8}VO_3$ having a density of 65.4% at a sintering temperature of 1400° C., a density of 70.0% at a sintering temperature of 1500° C., and a density of 77.1% at a sintering temperature of 1600° C. For each of the oxides thus prepared, conductivity is measured in the same manner as set forth in Experimental Example 1. Results are shown in FIG. 5. The results of FIG. 5 confirm that the conductivity may increase as the density increases, and the conductivity of the A-site deficient vanadium oxide ($Sr_{0.9}VO_3$) is 2.4 times higher than that of the A-site non-deficient vanadium oxide ($SrVO_3$).

Experimental Example 3

Measurement of Light Transmittance I

The band structures of $CaVO_3$, $SrVO_3$, and $BaVO_3$ are calculated based on first principles electronic structure calculations, and from the results thereof, the light transmittance of each material to light of a wavelength of 550 nm may be calculated from a simulation. Results are shown in Table 4. The simulation experiments are conducted as follows.

The band structures of $CaVO_3$, $SrVO_3$, and $BaVO_3$ are used to calculate intra-band transition by free electrons and inter-band transition by bound electrons. The effects of free electrons and bound electrons are considered to calculate a dielectric function, from which a complex function of reflective index is calculated. The function of the reflective index is used to calculate the reflective index and the absorption rate of the visible light.

TABLE 4

| $ABO_3$ | Light transmittance (R = 0, thickness = 10 nm) | Light transmittance (R = 0, thickness = 100 nm) | Light transmittance (R ≠ 0, t = 10 nm) | Light transmittance (R ≠ 0, t = 100 nm) |
| --- | --- | --- | --- | --- |
| $CaVO_3$ | 97% | 73% | 81% | 61% |
| $SrVO_3$ | 97% | 75% | 83% | 64% |
| $BaVO_3$ | 98% | 82% | 72% | 60% |

In Table 4, R=0 refers to the case where there is no reflection, while R≠0 refers to the case where there is reflection. The results of Table 4 confirm that the oxide has light transmittance of at least 97% when there is no reflection and the oxide has a thickness of 10 nm.

Experimental Example 4

Measurement of Light Transmittance II ($CaVO_3$ & $SrVO_3$)

Figure 6:
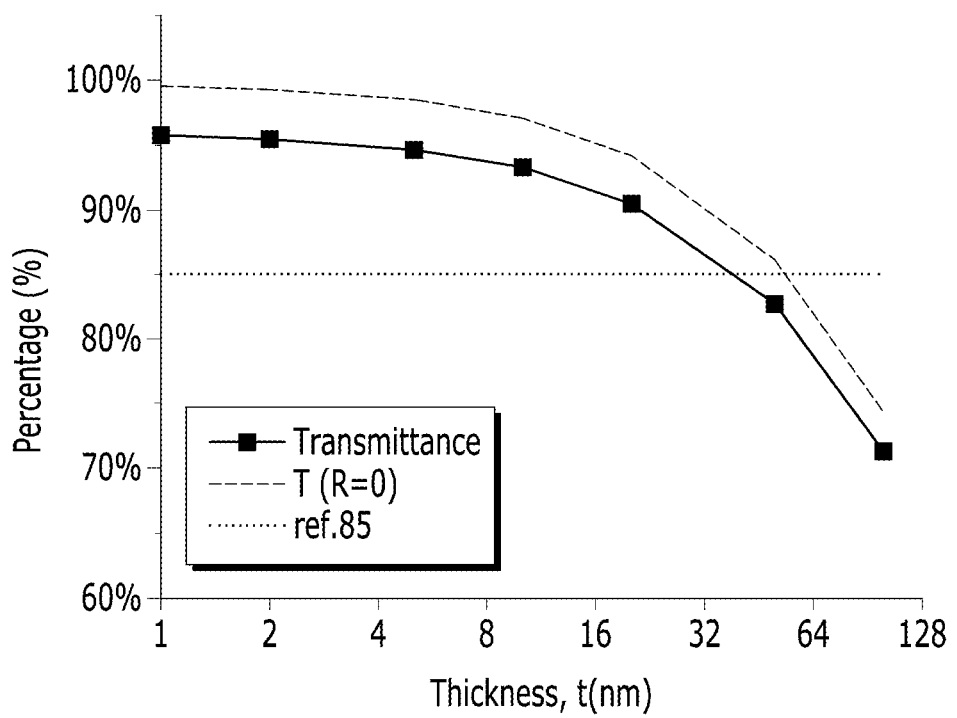
FIG. 6 shows a graph illustrating changes in transmittance versus thickness of the $CaVO_3$ thin film in Experimental Example 4.
Figure 7:
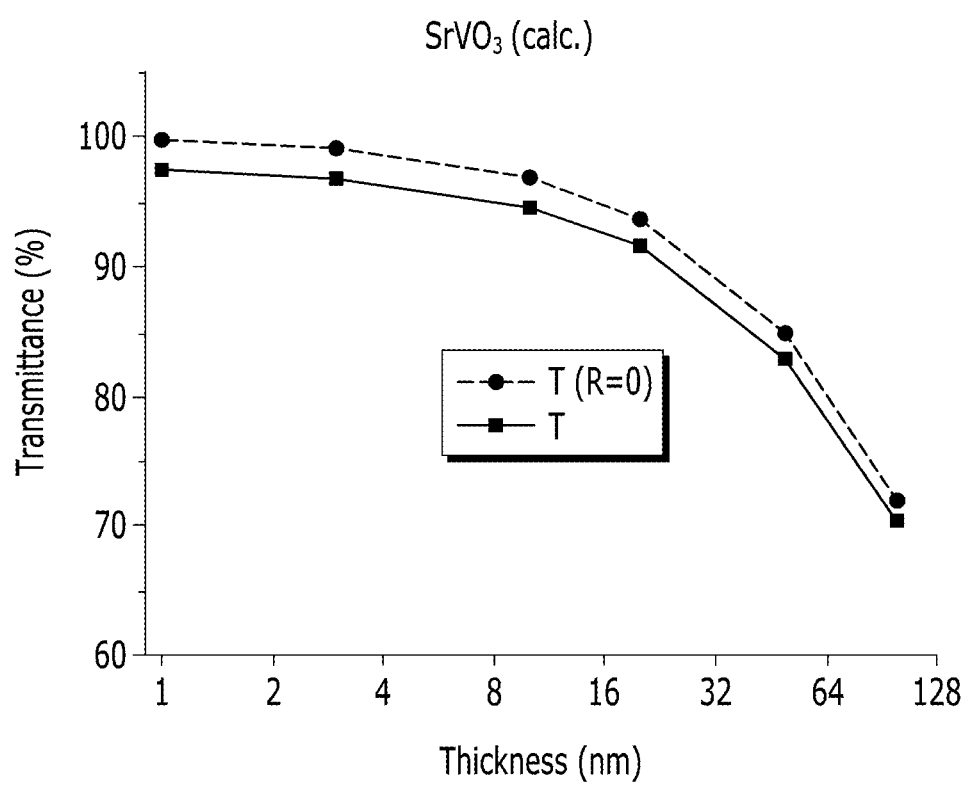
FIG. 7 shows a graph illustrating changes in light transmittance versus thickness of the $SrVO_3$ thin film in Experimental Example 5.

For each of $SrVO_3$ and $CaVO_3$ prepared from Reference Example 1 and Reference Example 4, the light transmittances at different thicknesses are measured in a similar way to Experimental Example 3, and results are shown in FIG. 6 for $CaVO_3$ and FIG. 7 for $SrVO_3$. The results of FIG. 6 and FIG. 7 confirm that the thin film of $SrVO_3$ or $CaVO_3$ may have high transmittance of at least 90%.

Experimental Example 5

For each of $SrVO_3$ and $Sr_{0.9}VO_3$ prepared from Reference Example 1 and Reference Example 2, powder diffuse reflection spectra are obtained using a spectrophotometer (model name: U-3310). From the spectral data, absorption spectra are obtained using the Kubelka-Munk relation. Results are shown in FIG. 8 and FIG. 9.

Figure 8:
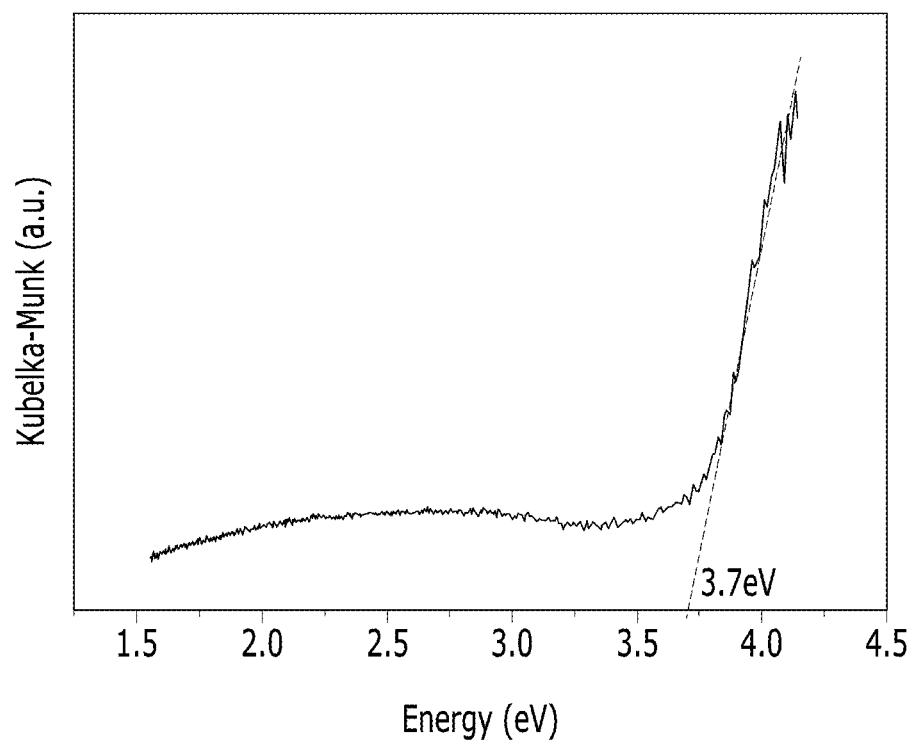
FIG. 8 shows an absorption spectrum of $SrVO_3$ obtained by using a Kubelka-Munk relation in Experimental Example 6.
Figure 9:
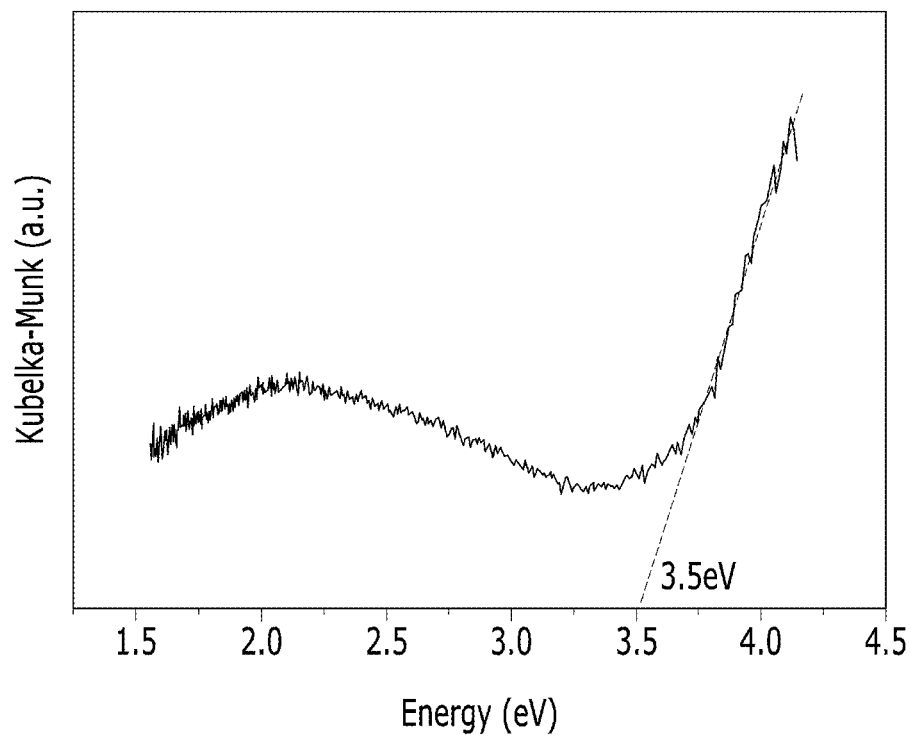
FIG. 9 shows an absorption spectrum of $Sr_{0.9}VO_3$ obtained by using a Kubelka-Munk relation in Experimental Example 6.

FIG. 8 and FIG. 9 confirm that $SrVO_3$ has a bandgap of about 3.7 eV, and $Sr_{0.9}VO_3$ has a band gap of around 3.5 eV, which implies that these materials may be used as a transparent conducting material in a visible light region.

Example 1

Preparation of Thin Film of $Sr_{0.9}VO_3$

The powder obtained from the re-calcination in Reference Example 2 is placed into a tungsten boat and thermal evaporation is carried out at room temperature with a deposition rate of 1 Å/s to form a thin film having a thickness of 100 nm on a $SiO_2$ glass. The thickness of the thin film, absorptivity (k), and refractive index (n) are measured by using Horiba ellipsometry, and the transmittance is measured using a spectrophotometer (model name: U-3310). From such measurement, it is confirmed that the thin film has transmittance of about 60%, and such a result corresponds to the light transmittance of Experimental Example 3.

Examples 2 and 3

Preparation of Thin Film of $Ca_{1-x}VO_3$

The sintered bodies each prepared from Reference Example 4 (for Example 2) and Reference Example 5 (for Example 3) are used as targets, and a sputtering process is conducted under the following conditions to obtain a thin film having a thickness of about 10 nm to 20 nm.

RF Magnetron Sputtering Apparatus
Substrate: $SiO_2$ glass
Sputtering gas pressure: $6 \times 10^{-3}$ torr
Gas composition: 100% argon
Power: 100 W
Sputtering time: about 2 minutes Examples 4 to 6

Preparation of Thin Film of $Sr_{1-x}VO_3$

The sintered bodies each prepared from Reference Example 1 (for Example 4), Reference Example 2 (for Example 5), and Reference Example 3 (for Example 6) are used as targets, and a sputtering process is conducted under the same conditions as in Examples 2 and 3 to obtain a thin film having a thickness of about 10 nm to about 20 nm.

While some example embodiments have been particularly shown and described, it will be understood by one of ordinary skill in the art that variations in form and detail may be made therein without departing from the spirit and scope of the claims.

What is claimed is:

1. A transparent conductive thin film comprising:
a perovskite vanadium oxide represented by Chemical Formula 1, $$A_{1-x}VO_{3\pm\delta},\qquad \text{[Chemical Formula 1]}$$

wherein A is a Group II element, 0<x<1, and δ is a number necessary for charge balance in the perovskite vanadium oxide.

2. The transparent conductive thin film of claim 1, wherein the Group II element includes one of calcium (Ca), strontium (Sr), barium (Ba), and a combination thereof.

3. The transparent conductive thin film of claim 1, wherein in Chemical Formula 1, x is equal to or larger than zero and less than 0.5.

4. The transparent conductive thin film of claim 1, wherein a conductivity of the transparent conductive thin film is greater than or equal to about 5000 S/cm.

5. The transparent conductive thin film of claim 1, wherein a transmittance of the transparent conductive thin film is greater than or equal to about 60% with respect to light of a wavelength of about 550 nm at a thickness of about 10 nm.

6. The transparent conductive thin film of claim 1, wherein a relative density of the transparent conductive thin film is greater than or equal to about 70% with respect to an ideal density, as measured according to ASTM C373.

7. An electronic device comprising:
a transparent conductive thin film including
a perovskite vanadium oxide represented by Chemical Formula 1, $$A_{1-x}VO_{3\pm\delta},\qquad \text{[Chemical Formula 1]}$$

wherein A is a Group II element, 0<x<1, and δ is a number necessary for charge balance in the perovskite vanadium oxide, and the perovskite vanadium oxide is an A-site-deficient perovskite vanadium oxide.

8. The electronic device of claim 7, wherein the Group II element includes one of calcium (Ca), strontium (Sr), barium (Ba), and a combination thereof.

9. The electronic device of claim 7, wherein a conductivity of the transparent conductive thin film is greater than or equal to about 5000 S/cm.

10. The electronic device of claim 7, wherein a transmittance of the transparent conductive thin film is greater than or equal to about 60% to light of a wavelength of about 550 nm at a thickness of about 10 nm.

11. The electronic device of claim 7, wherein the electronic device is one of a flat panel display, a touch panel screen, a photovoltaic cell, an e-window, a heat mirror, and a transparent transistor.

12. The transparent conductive thin film of claim 1, wherein in Chemical Formula 1, δ is in a range of −0.5 to 0.5.

13. The electronic device of claim 7, wherein in Chemical Formula 1, δ is in a range of −0.5 to 0.5.

* * * * *